(12) United States Patent
Rose

(10) Patent No.: US 9,665,574 B1
(45) Date of Patent: May 30, 2017

(54) AUTOMATICALLY SCRAPING AND ADDING CONTACT INFORMATION

(75) Inventor: Robert Brett Rose, Boulder, CO (US)

(73) Assignee: Google Inc., Mountain View, CA (US)

( * ) Notice: Subject to any disclaimer, the term of this patent is extended or adjusted under 35 U.S.C. 154(b) by 230 days.

(21) Appl. No.: 13/446,662

(22) Filed: Apr. 13, 2012

(51) Int. Cl.
*G06F 17/30* (2006.01)

(52) U.S. Cl.
CPC .. *G06F 17/30035* (2013.01); *G06F 17/30884* (2013.01); *G06F 2207/025* (2013.01)

(58) Field of Classification Search
CPC ............... G06F 17/30017; G06F 17/24; G06F 17/2247; G06F 17/30035
USPC ............................................. 715/202
See application file for complete search history.

(56) References Cited

U.S. PATENT DOCUMENTS

| | | | |
|---|---|---|---|
| 6,349,299 B1* | 2/2002 | Spencer | G06F 17/30569 707/702 |
| 2002/0152265 A1* | 10/2002 | Felman | G06Q 10/10 709/203 |
| 2006/0046768 A1 | 3/2006 | Kirbas | |
| 2006/0195338 A1* | 8/2006 | Seibel et al. | 705/1 |
| 2007/0053335 A1 | 3/2007 | Onyon et al. | |
| 2008/0162649 A1* | 7/2008 | Lee et al. | 709/206 |
| 2008/0243841 A1* | 10/2008 | Bonnet | G06F 17/2705 |
| 2009/0070684 A1* | 3/2009 | Aldrich | G06Q 50/01 715/743 |
| 2010/0261463 A1 | 10/2010 | Collet et al. | |
| 2010/0306185 A1* | 12/2010 | Smith et al. | 707/709 |
| 2011/0276595 A1* | 11/2011 | Kirkland et al. | 707/769 |
| 2012/0078906 A1* | 3/2012 | Anand et al. | 707/737 |
| 2012/0230538 A1* | 9/2012 | Calman | G06F 17/30247 382/103 |
| 2013/0172014 A1* | 7/2013 | Kaul et al. | 455/456.3 |

* cited by examiner

*Primary Examiner* — Scott Baderman
*Assistant Examiner* — Seung Jung
(74) *Attorney, Agent, or Firm* — Brake Hughes Bellermann LLP

(57) ABSTRACT

Methods and systems that add contact information to personal contacts database are provided. One or more contact indicators are identified within a document. The contact indicators at least partially represent contact identification information of an individual or place. One or more contact identification profiles which match the one or more contact indicators are identified. Each of the one or more identified contact identification profiles are displayed with an option of adding each contact identification profile to a personal contacts database.

14 Claims, 7 Drawing Sheets

AUTOMATICALLY SCRAPING AND ADDING CONTACT INFORMATION

BACKGROUND

Field

Embodiments are generally related to an application or service that adds contact information to a contact database.

Related

In general, individuals use a variety of techniques to store and manage contact information related to an individual or business. Mobile devices have the ability to provide a personal contacts database for users to store contact information. However, it is often time consuming for a user to manually enter a contact into his contacts database. Further, manual entry is susceptible to errors being included in the entered information.

BRIEF SUMMARY

Embodiments described herein relate to methods and systems for adding contact information to a personal contacts database. One or more contact indicators are identified within a document. The contact indicators at least partially represent contact identification information of an individual or place. One or more contact identification profiles which match the one or more contact indicators are identified. Each of the one or more identified contact identification profiles are displayed with an option of adding each contact identification profile to a personal contacts database.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
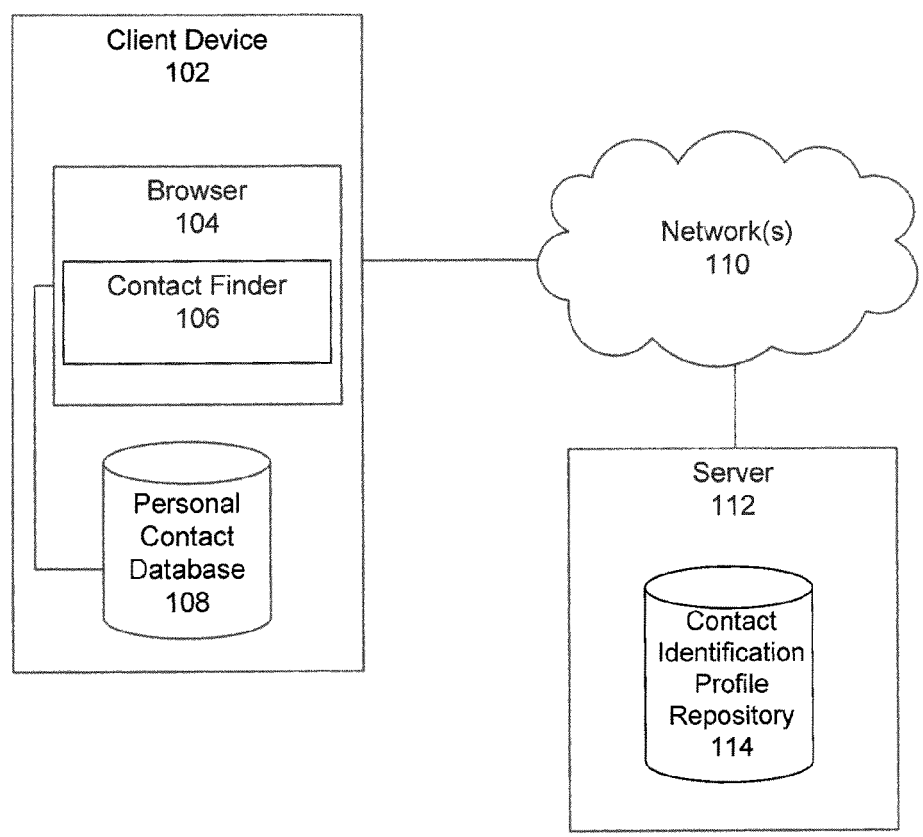
FIG. 1 is a diagram illustrating an example system, according to an embodiment.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Contact databases function as a resource for users to store, manage and retrieve contact information related to an individual or a place of business. An application, as described herein, allows its users to optionally add contact information identified within a document to a personal contacts database. In an example use of such an application, a user may visit a webpage of a business of interest. Using the application, the webpage may be scanned for potential contact information related to the business of interest. Once potential contact information is identified, this information may be checked against a repository storing contact identification profiles. A contact identification profile is a record including contact information about a person or place, such as name, address, telephone number, website URL, or a social networking profile name. Once a matching contact identification profile is identified, the contact information of the contact identification profile is displayed to the user. The user is then provided the option to add the information from the contact identification profile to a personal contacts database.

It is noted that the embodiments are not limited to this example application, but are instead applicable to other applications as would be apparent to persons skilled in the art based on the teachings provided herein. Those skilled in the art with access to the teachings provided herein will recognize additional modifications, applications, and embodiments within the scope thereof and additional fields in which the embodiments would be of significant utility. For example, an individual may take a photograph including the name of a business of interest. The application then detects the name in the photograph and performs a similar contact identification process, as discussed in the example above. The individual is presented with contact information related to the business of interest and an option to add the contact information to a personal contacts database is provided.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 1 is a block diagram illustrating a contact identification system 100 for automatically identifying and adding contact information. Contact identification system 100 includes a server 112, and a client computing device 102 coupled via one or more networks 110, such as the Internet or a local area network. Client computing device 102 includes a browser 104, contact finder application 106, and personal contacts database 108. Server 112 includes a contact identification profile repository 114.

In general, contact identification system 100 operates as follows. Contact finder application 106 identifies potential contact information on a web page displayed by browser 104. The potential contact information is parsed to generate a contact indicator. Contact finder application 106 makes a request to locate a contact identification profile which matches the generated contact indicator within contact identification profile repository 114. Upon identifying a matching contact identification profile, client computing device 102 receives the information within the profile. Browser 104 displays the information within the contact identification profile to a user. The user is provided an option to edit the contact identification profile to add, modify or delete information. The user is then provided an option to add the contact information to personal contacts database 108. Upon the user opting to add the displayed information, the contact information is added to personal contacts database 108. The user then has the ability to manage or retrieve the contact information from personal contact database 108 at a later time.

Contact finder application 106 identifies one or more contact indicators within a document. In an embodiment, a document may be a computer stored document, including, but not limited to a webpage, photograph, or an electronic book or document. For example, contact finder application 106 may identify a contact indicator within a webpage viewed by a user or within a photograph taken by a user. Additionally, contact finder application 106 may identify a contact indicator within an electronic book or document. For example, a user may have an electronic book or document that includes a list of their contacts that they would like added to their personal contacts. A contact indicator at least partially represents contact identification information for an individual or a place. For example, the contact indicator may be a name, an address, a telephone number, etc.

In an embodiment, identifying a contact indicator includes electronically detecting a user interaction with a set of information contained within the document and parsing the set of information. For example, a user may navigate to a web page for a business of interest. The web page may include potential contact information such as the business name, phone number or address. A user may interact with the potential contact information and perform a user operation, such as highlighting or right clicking the potential contact information. In response to the user interaction, the information is parsed to generate a contact indicator.

In another embodiment, identifying a contact indicator includes electronically scanning the document for potential contact information based on one or more contact heuristics and parsing the potential contact information. For example, contact finder application 106 may be configured to automatically scan a displayed web page or a photograph and identify a contact indicator. According to an embodiment, a contact heuristic may be one of a name, telephone number, address, or combination thereof. Contact finder application 106 may scan the web page or photograph searching for patterns of data that represent contact information. For example, upon seeing a pattern of five numerical values in a row, contact finder application 106 may identify that data as a potential zip code of an address. The potential zip code and some of the information directly preceding it may be parsed to generate a contact indicator. Another pattern that may be recognized as a contact indicator are three digits followed by a hyphen and four additional digits, which may be recognized as a telephone number. Contact finder application 106 may scan a web page or photograph for contact indicators using optical character recognition (OCR) technology. OCR (optical character recognition) is the recognition of printed or written text characters by a computer. This involves the analysis and translation of a character image into character codes, such as ASCII. OCR technology can extend the functionality of mobile devices and aid in the management of a personal contacts database.

Contact finder application 106 identifies one or more contact identification profiles which match the identified contact indicator. For example, in response to identifying a contact indicator, contact finder application 106 sends a request to server 112 via network 110 to locate contact identification profiles within contact identification profile repository 114. Contact identification profile repository 114 may store a plurality of contact identification profiles. A contact identification profile includes information related to contact information for an individual or place. For example, a contact identification profile may be a database record including, but not limited to, a name, physical address, phone number, or web site address of a business of interest. A comparison between the identified contact indicator and each contact identification profile is made to determine a match. In an embodiment, a match is based on one or more contact heuristics. For example, a contact indicator may include the address of a business of interest. Upon sending a request for a matching contact identification profile, a search of the address portion of a contact identification profile is performed for each contact identification profile within contact identification profile repository 114. Once a match is found, all of the contact information within the matched contact identification profile is sent to contact finder application 106 on client computing device 102.

According to an embodiment, a new contact identification profile is generated if a matching contact identification profile is not found. For example, if a matching contact identification profile is not identified within contact identification profile repository 114, server 112 may perform a search of another webserver (not pictured). Server 112 may attempt to identify contact identification information matching the identified contact indicator. In response to finding such information, a new contact identification profile may be generated, and that information is then sent to contact finder application 106 on client computing device 102.

Contact finder application 106, in response to receiving information from server 112, displays the identified contact identification profile on browser 104. In an embodiment, an option of adding the contact identification profile to a personal contacts database is provided. For example, the contact identification profile information received from server 112 may be displayed in a menu which appears as a pop-up window or side bar window on browser 104. The menu may have an option button providing the ability to add the contact identification profile to personal contacts database 108. In response to a user choosing to add the contact identification profile, the information from the contact identification profile is added to personal contacts database 108.

In an embodiment, an option to edit the contact identification profile prior to adding it to the personal contact database may be provided.

Contact finder application 106, or any combination of its components, may be part of or may be implemented with a computing device. Examples of computing devices include, but are not limited to, a computer, workstation, distributed computing system, computer cluster, embedded system, standalone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

Network 110 may be any network or combination of networks that can carry data communications. Such a network 110 may include, but is not limited to, a local area network, metropolitan area network, and/or wide area network such as the Internet. Network 110 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

Server 112 is a computing device or an application executing on a computing device that hosts contact identification profile repository 114. Contact identification profile repository 114 may store data associated with contact information for an individual or place, such as a contact identification profile. Contact identification profile repository 114 can be hosted by one or more servers 112. Server 112 delivers data within contact identification profile repository 114 to client computing device 102. Contact identification profile repository 114 can store any data that can be provided over network 110. The data stored in contact identification profile repository 114 may be identified by a resource tag that is associated with each contact identification profile. The data within contact identification profile repository 114 may include, for example, contact identification profiles stored as database records. The data in contact identification profile repository 114 can include content, such as words, phrases, images and sounds, that may include embedded information (such as meta-information in hyperlinks) and/or embedded instructions (such as JavaScript scripts).

Client computing device 102 is a processor-based electronic device that is manipulated by a user and is capable of requesting and receiving data within contact identification profile repository 114 over network 110. Examples of client computing device 102 include personal computers, mobile communication devices and tablet computers. Client computing device 102 typically includes an application, such as browser 104. A user may utilize browser 104 to request data within contact identification profile repository 114, such as contact information over network 110. For example, a request for data within contact identification profile repository 114 may be sent by contact finder application 106 of client computing device 102 in response to identifying one or more contact indicators within a document. In, response to the request, server 112 delivers data within contact identification profile repository 114 to client computing device 102. When client computing device 102 receives data within contact identification profile repository 114 from server 112, client computing device 102 uses browser 104 to display the data to the user.

Browser 104 may be any kind of browser. Browser 104 may also include a contact finder application 106. Contact finder application 106 may extend the functionality of browser 104 and can be configured to identify potential contact information within a document and add it to personal contacts database 108. For example, contact finder application 106 may be a browser extension downloaded from a web server and installed on client computing device 102 as part of browser 104. Contact finder application 106 may be developed by an application developer on client computing device 102 or any other computing device. A programming language, such as JavaScript may be used to develop contact finder application 106 on client computing device 102. Contact finder application 106 may then be stored locally on client computing device 102. Alternatively, contact finder application 106 may be uploaded to a contact manager server (not shown). Contact manager server may distribute contact finder application 106 to additional client computing devices due to a request from a user.

Although contact finder application 106 is described herein as operating in conjunction with a browser, one of skill in the art will recognize that contact finder application 106 may instead be implemented as a stand-alone application on client computing device 102.

Figure 2:
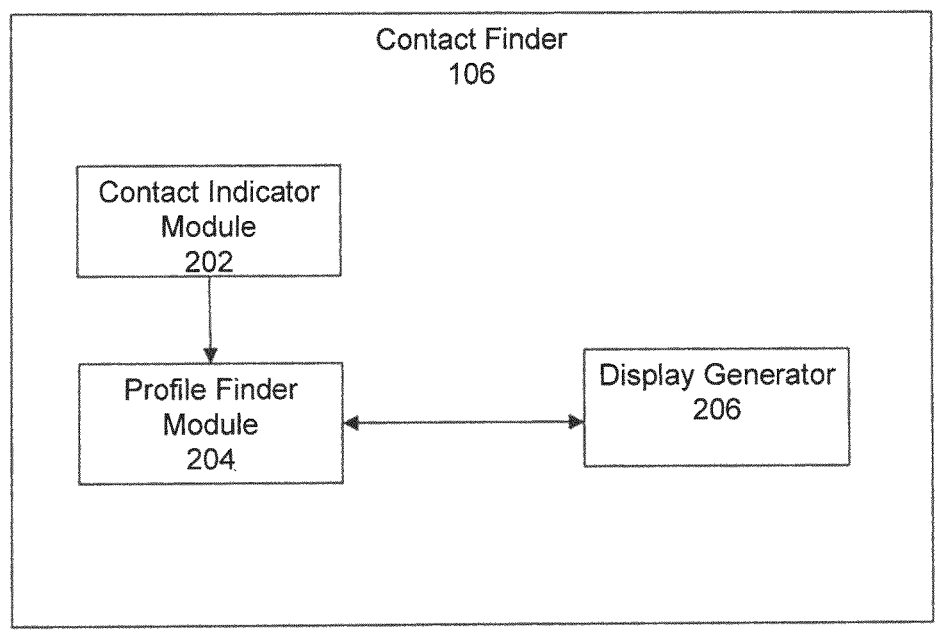
FIG. 2 is an illustration of a contact finder application, according to an embodiment.
Figure 3:
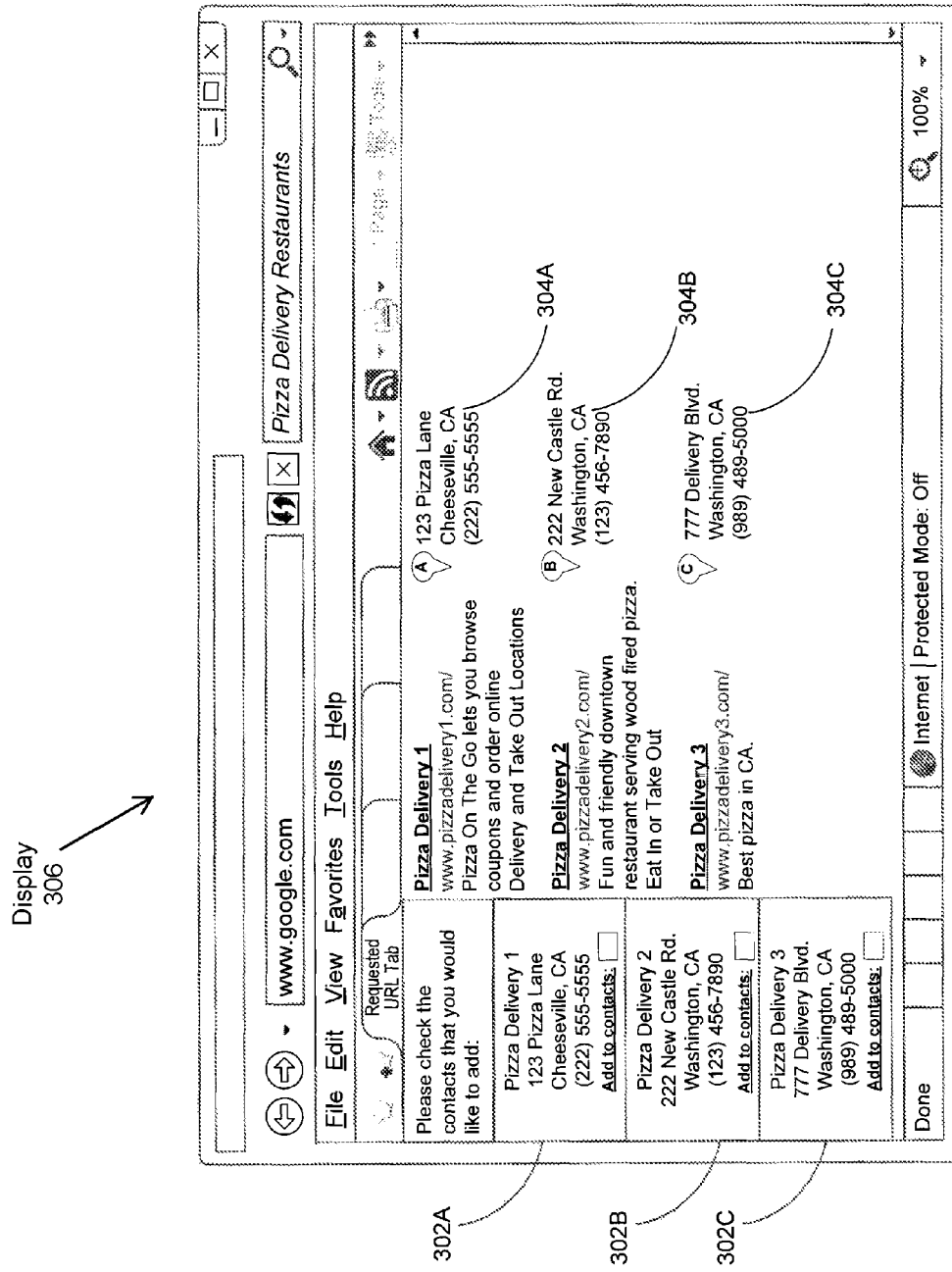
FIG. 3 is an illustration of an example display view of an exemplary system, according to an embodiment.
Figure 4:
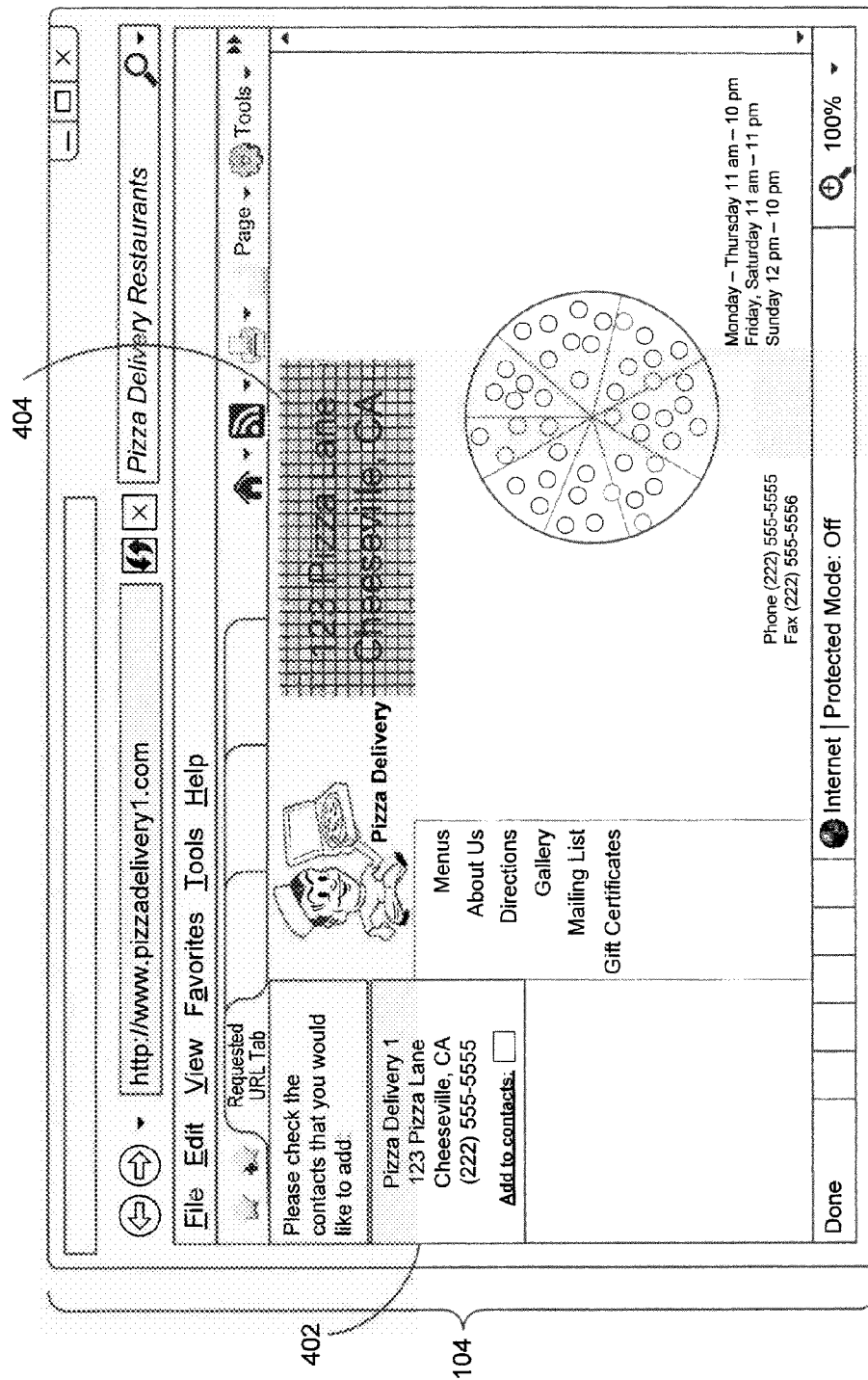
FIG. 4 is another illustration of an example display view of an example system, according to an embodiment.

FIG. 2 is an illustration of a contact finder application, according to an embodiment. Contact finder application 106 includes contact indicator module 202, profile finder module 204, and display generator 206. Contact finder application 106 may be configured to identify contact information within a document and add it to a personal contacts database. FIG. 2 will be discussed in relation to FIG. 3 and FIG. 4 in order to illustrate certain embodiments. FIG. 3 and FIG. 4 are illustrations of example display views of an example system, according to embodiment.

In operation, contact indicator module 202 is configured to identify one or more contact indicators within a document, where the contact indicator at least partially relates to contact information for an individual or a place. In an embodiment, a document may be a computer stored document, including, but not limited to a webpage, photograph, or an electronic book or document. For example, the document may be a page from a website a user is viewing, or the document may be a picture taken by a user via an image capturing device (e.g. a camera) of a mobile phone. According to an embodiment, one or more contact indicators may be identified by scanning the document for potential contact information based on one or more contact heuristics. For example, contact indicator module 202 may scan a web page displayed on browser 104 as illustrated by FIG. 3. Contact indicator module 202 may identify one or more contact indicators 304A, 304B, and 304C. According to an embodiment, a contact indicator may be identified based on one or more contact heuristics. A contact heuristic may be one of a name, a telephone number, an address, or a combination thereof, according to an embodiment. For example, using OCR-based technology, contact indicator module 202 may scan the displayed web page and search for patterns of data which may be related to contact information for an individual or place. The pattern search may be based on the contact heuristic. A pattern of data that resembles a name, address or phone number would be identified as a contact indicator. Contact indicators 304A, 304B, 304C illustrate data appearing within the web page, each contact indicator having a combination of data, which when scanned has patterns indicating potential contact information.

According to another embodiment, one or more contact indicators may be identified in response to a user interaction with a set of information contained within a document. For example, contact indicator module 202 may identify a contact indicator in response to a user interaction with a web page as illustrated by FIG. 4. According to an embodiment, a user interaction may be a selection of a set of information followed by one of a right click, left click, shift-click, or control-click. For example a user may be viewing the displayed web page and interact with set of information 404. The user may select and highlight the information. In response, contact indicator module 202 is configured to identify this information as a contact indicator.

Profile finder module 204 is configured to generate a request for one or more contact identification profiles matching the identified contact indicator. According to an embodiment, in response to an identification of a contact indicator, a request is sent to a server to identify contact identification profiles matching the identified contact indicator. For example, in response to contact indicator module 202 identifying a contact indicator, profile finder module 204 may send a Hypertext Transfer Protocol (HTTP) request to server 112 for a contact identification profile matching the contact indicator. Upon receipt of the request, server 112 searches within contact identification profile repository 114 for a matching contact identification profile. According to an embodiment, a matching contact identification profile may be identified based on one or more contact heuristics. In an embodiment, a contact heuristic may be one of a name, a telephone number, an address, or GPS-location data. The GPS-location data may be retrieved from a mobile device equipped with GPS capturing technology. For example, when a user takes a photograph including contact information, the GPS coordinates of where the picture was captured can be used as a contact heuristic.

For example, profile finder module 204 may generate a HTTP request for a matching contact identification profile, by sending a message including a type of the contact indicator data. The type of the contact indicator data may be based on a contact heuristic, such as at least a partial name, telephone number, address, or GPS-location data according to an embodiment. The type of the contact indicator data is used by server 112 to identify whether a contact identification profile will be identified based on a name, telephone number, address, GPS-location data or combination thereof. Profile finder module 204 is further configured to receive a response message from server 112, including information related to a contact identification profile matching the identified contact indicator.

Display generator 206 is configured to display information related to an identified contact identification profile. According to an embodiment, upon receipt of information related to an identified contact identification profile, the information is extracted and a display is populated with the information of the contact identification profile. In an embodiment, an option, such as a checkbox, is provided enabling a user to add the contact identification profile to a personal contacts database. FIG. 3 and FIG. 4 illustrate the display of matching contact identification profiles.

As illustrated in FIG. 3, upon automatic identification of contact indicators 304A, 304B, and 304C and receiving the respective contact identification profile information, a display 306 is populated with data 302A, 302B, and 302C. Data 302A, 302B, and 302C correspond to each contact identification profile identified based on contact indicators 304A, 304B, and 304C. Display 306 provides an option to add each contact identification profile to a personal contact database. For example, upon a user selecting a "Yes" option for data 302A, 302B, 302C, each contact identification profile is added to personal contacts database 108. According to an embodiment, an option may be provided to edit the contact identification profile prior to adding it to the personal contacts database. For example, a user may add to, modify, or delete portions of the name, address, or telephone number of a contact identification profile, prior to checking the "Yes" option box to add the contact identification profile to the personal contacts database.

As illustrated in FIG. 4, upon detection of a user interaction with a set of information 404, menu 402 is displayed with a matching contact identification profile. The user is provided with the option to add and manage the contact identification profile, as discussed previously.

In an embodiment, each of the constituent parts of contact identification system 100 may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

It should be noted that computer-readable medium storage embodiments may include any physical medium which is capable of having instructions encoded thereon that may subsequently be used by one or more processors to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible storage medium that can serve in the role of providing instructions to one or more processors may be used to store the instructions in these embodiments.

Overview of the Method

Figure 5:
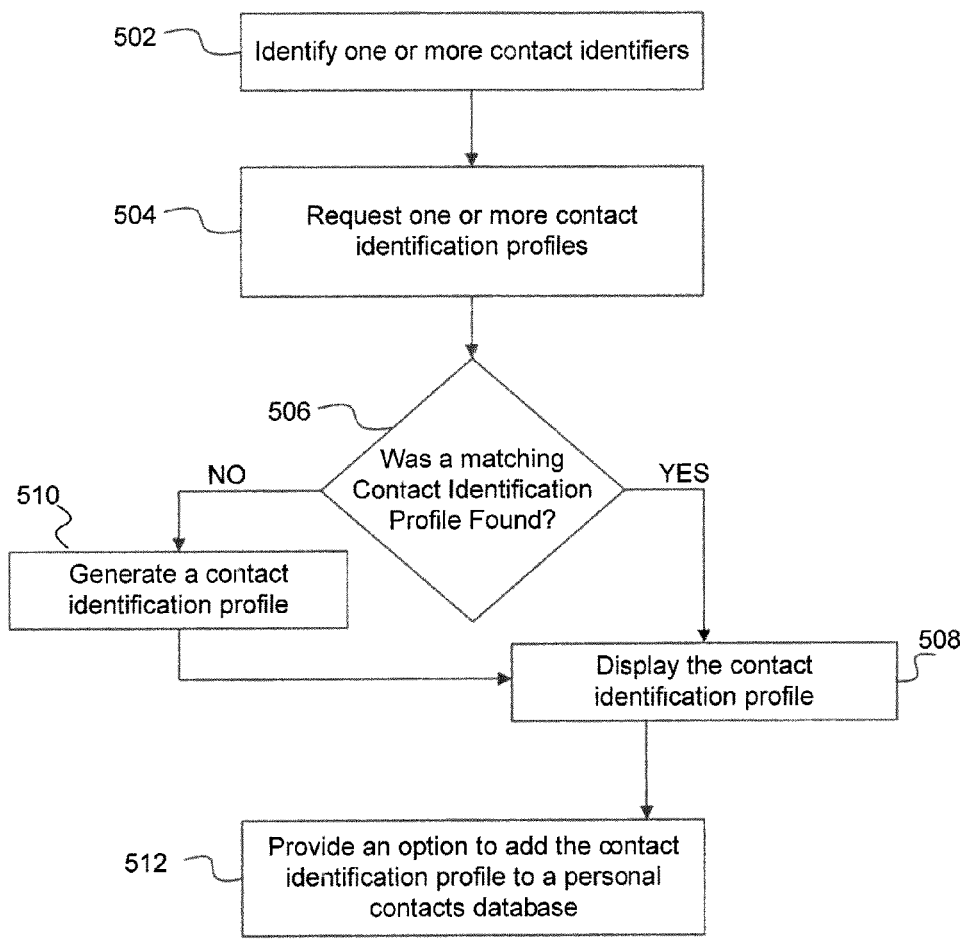
FIG. 5 is an illustration of a flow diagram of an example method of operation, according to an embodiment.
Figure 6B:
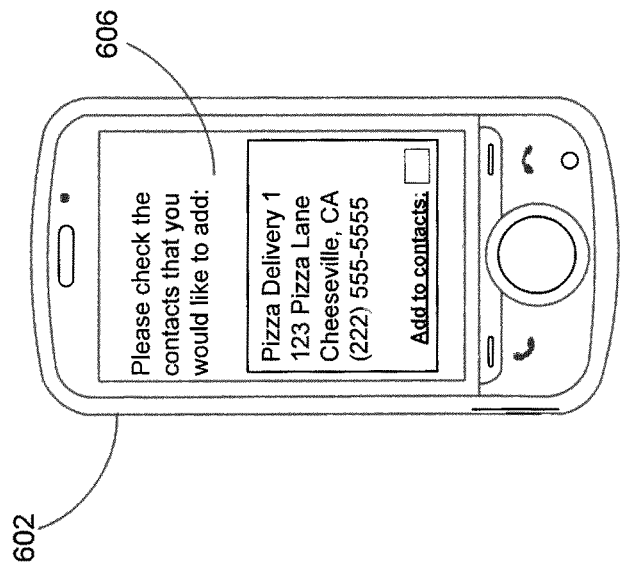
FIGS. 6A and 6B are illustrations of example display views of an example system, according to an embodiment.
Figure 6A:
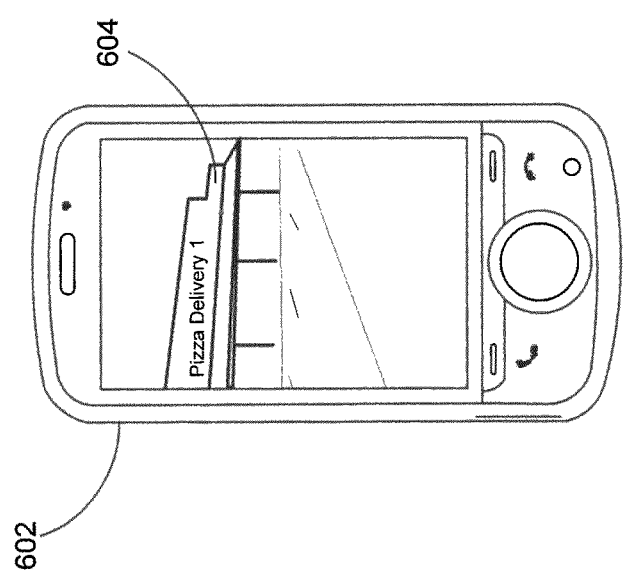
Figure 7:
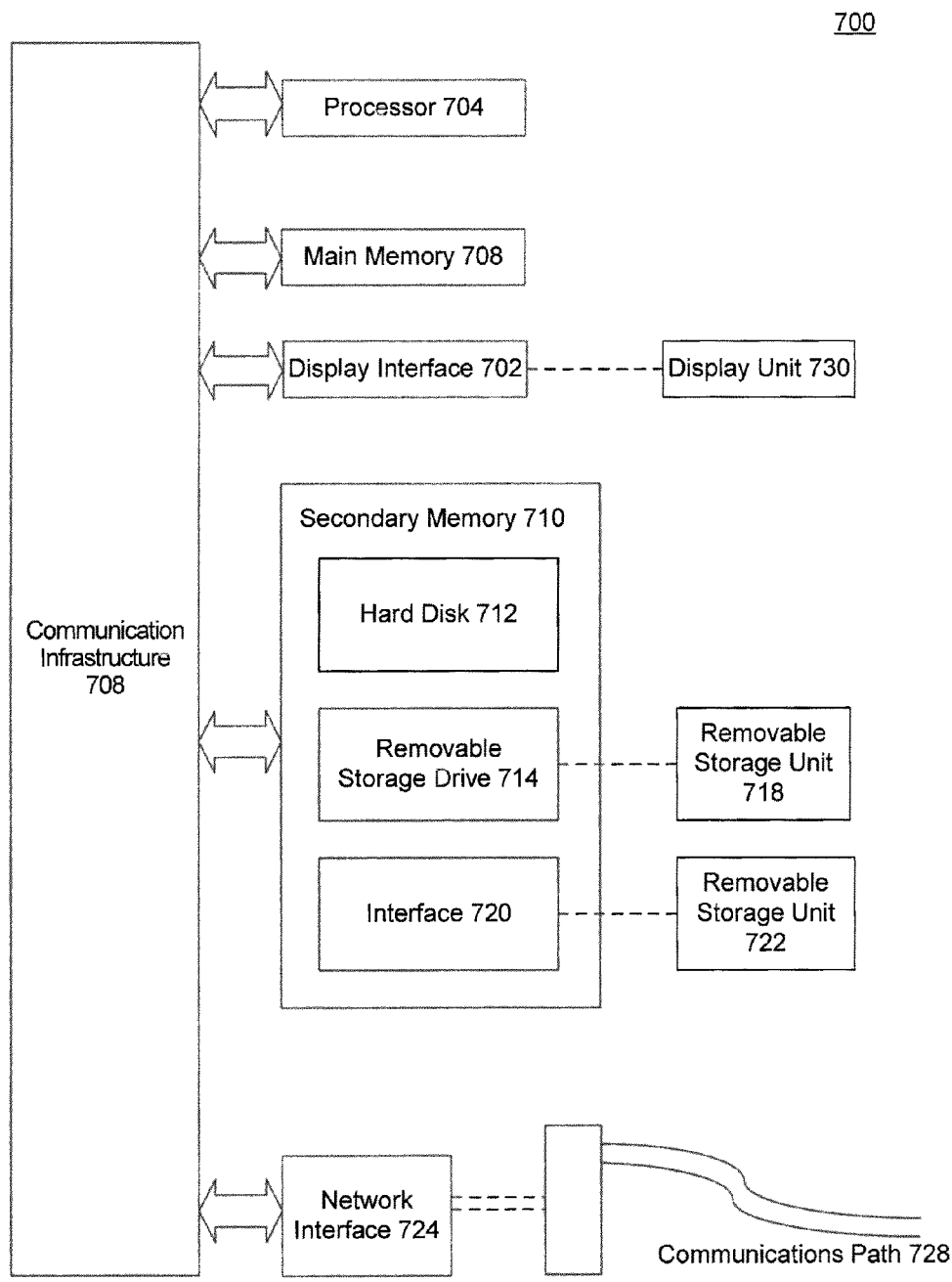
FIG. 7 is a diagram of an example system that may be used to implement embodiments disclosed herein.

FIG. 5 is an illustration of a flow diagram of an example method of operation for automatically adding contact information to a contact database, according to embodiment. Further embodiments will be described using a combination of FIG. 5, FIG. 6A, and FIG. 6B. FIGS. 6A and 6B are another illustration of an example display view of an example system, according to embodiment.

In stage 502, one or more contact indicators are identified. For example, one or more contact indicators may be identified by contact finder application 106 on client computing device 102. A contact indicator is a set of information located within a document which at least partially represents contact identification information of an individual or place. For example, contact finder application 106 may automatically scan a web page and search for patterns of data which may be related to contact information for an individual or place. A search for such patterns of data may be based on a contact heuristic such as one of a name, a telephone number, an address, or a combination thereof. Upon identifying patterns of data which may be related to contact information for an individual or a place, the data is parsed to generate a contact indicator.

According to an embodiment, a contact indicator may be identified based on a user interaction with data in a web page. For example, within a webpage a user may select and highlight a set of data related to contact information for an individual. In response to highlighting the data, contact finder application 106 parses the information and generates a contact indicator. In another embodiment, a contact indicator may be identified by taking a photograph. For example, a mobile device 602 equipped with a camera may include contact finder application 106. In response to a user taking a photograph 604 including the name of a business of interest using the mobile device, the name may be recognized as a contact indicator by contact finder application 106. The name of the business of interest in the photograph may be analyzed and parsed, and a contact indicator may be generated. The recognition of patterns of data indicative of contact information related to an individual or place may be performed by contact finder application 106 using OCR-based technology, known to those skilled in the art. In an embodiment, mobile device 602 may be equipped with geo-location capturing technology, such as, but not limited to GPS. When a user takes photograph 604, the coordinates of the location where the picture was captured will be used as a contact heuristic. When the contact indicator is generated, the geo-location information will be included. The geo-location information may be useful in a scenario, where the photograph 602 captures information about a business, in which there may be multiple businesses with the same name. For example, photograph 604 captures the name of a restaurant entitled "Pizza Delivery 1". There may be many restaurants with the same name if, for example, "Pizza Delivery 1" is a part of a chain of restaurants. Thus, the geo-location information captured with the photograph may be used to identify the specific restaurant in question.

At stage 504, a request for one or more contact identification profiles which match the generated contact indicators is sent. For example, a request for one or more contact identification profiles may be sent by contact finder application 106 on client computing device 102. The request may be generated in response to identifying one or more contact indicators. The request is for one or more contact identification profiles within contact identification profile repository 114 which include data matching the one or more identified contact indicators. According to an embodiment, a request to identify a matching contact identification profile may be based on the contact heuristic. The contact heuristic may determine how the data within contact identification profile repository 114 is searched. For example, if a contact indicator is based on data related to an address or geo-location information, a matching contact identification profile is identified based on the address or geo-location information.

At stage 506, it is determined whether a matching contact identification profile was identified. If one or more matching contact identification profiles are found, method 500 proceeds to step 508. If a matching contact identification profile is not found, method 500 proceeds to step 510.

At stage 508, the one or more matching contact identification profiles are displayed. For example, the one or more matching contact identification profiles are displayed by display generator 206 of contact finder application 106. FIG. 6B illustrates the display of a matching contact identification profile 606 on mobile device 602. The matching contact identification profile 606 displays contact information related to business depicted in photograph 604. Contact identification profile 606 includes information such as the name, address, and phone number of the business. In an embodiment, the contact identification profile can include information such as a URL to a company website, or social networking profile page.

At stage 510, one or more contact identification profiles are generated. For example, the one or more contact identification profiles may be generated by profile finder module 204 of contact finder application 106. According to an embodiment, if a matching contact identification profile is not found, then the contact indicator information is sent to server 112. Server 112 may generate a contact identification profile by performing a search of another web server for contact information related to the identified contact indicator. For example, server 112 may search the web for information matching the identified contact indicator.

At stage 512, an option to add the contact identification profile to a personal contacts database is provided. For example, the option to add the contact identification profile to a personal contacts database is provided by display generator 206 of contact finder application 106. A user has the ability to see each contact identification profile 606 which was identified or generated and has the option to add each contact identification profile to their personal contacts database. After adding the contact identification profile 606, a user may retrieve that information at a later time. In an embodiment, prior to adding the contact identification profile 606 to a personal contacts database, an option to modify the contact identification profile is provided. For example, a user may choose to modify or personalize portions of the name, address, or zip code prior to adding the information to their personal contacts database.

Additional Features

Some individuals may not want personal contact information divulged by an application, such as the one presented in connection with these embodiments. Therefore, it is desirable to only provide contact information of individuals who have opted to provide their information and who have given their informed consent before they use embodiments, so that users who are unwilling to accept the privacy trade-offs inherent to use of these embodiments do not participate.

Computer System

Various aspects of the present invention can be implemented by software, firmware, hardware, or a combination thereof. FIG. 6 illustrates an example computer system 700 in which the embodiments, or portions thereof, can be implemented as computer-readable code. For example, contact identification system 100 carrying out method 500 of FIG. 5 can be implemented in system 700. Various embodiments of the invention are described in terms of this example computer system 700.

Computer system 700 includes one or more processors, such as processor 704. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive and/or a removable storage drive. Removable storage drive 714 may include a floppy disk drive, a magnetic tape drive, an optical disk drive, a flash memory, or the like. The removable storage drive 714 reads from and/or writes to removable storage unit 718 in a well-known manner. Removable storage unit 718 may include a floppy disk, magnetic tape, optical disk, etc. which is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals which may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the term "computer readable storage medium" is used to generally refer to media such as removable storage unit 718, removable storage unit 722, and a hard disk installed in hard disk drive 712. Computer readable storage medium can also refer to one or more memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the embodiments as discussed herein. In particular, the computer programs, when executed, enable processor 704 to implement the processes of embodiments of the present invention, such as the steps in the methods discussed above. Accordingly, such computer programs represent controllers of the computer system 700. Where embodiments are implemented using software, the software may be stored in a computer program product and loaded into computer system 700 using removable storage drive 714, interface 720, or hard drive 712.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

CONCLUSION

The Summary and Abstract sections may set forth one or more but not all example embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the following claims and their equivalents.

What is claimed is:

1. A computer implemented method for adding contact information, the method comprising:

in response to a user identifying and interacting with potential contact information within a web page, parsing the potential contact information and generating a contact indicator using the potential contact information, the generating the contact indicator comprising recognizing a pattern based on the at least one contact heuristic that specifies patterns of data that indicate contact information for an individual or a place and the potential contact information, the contact indicator partially representing contact information for the individual or the place;

sending, to a server, a request for a contact identification profile matching the generated contact indicator, the request including the contact indicator partially representing contact information for the individual or the place;

receiving, from the server based on the request and the individual or the place having opted to provide contact information, a plurality of matching contact identification profiles, the plurality of matching contact identification profiles including all of the contact information within the plurality of matching contact identification profiles;

providing, to the user, an option to select one of the plurality of matching contact identification profiles;

providing, to the user, an option to modify the selected matching contact identification profile;

after providing the option to modify the selected matching contact identification profile, providing the user an option of adding the selected matching contact identification profile to a personal contacts database; and in response to the user selecting the option to add the selected matching contact identification profile, adding the selected matching contact identification profile to the personal contacts database.

2. The method of claim 1, further comprising:

creating a new contact identification profile based on the contact indicator when no matching contact identification profile is found by the server.

3. The method of claim 1, wherein the generating the contact indicator comprises detecting the user highlighting the potential contact information contained within the web page.

4. The method of claim 3, wherein the highlighting includes highlighting the potential contact information followed by one of a right click, left click, shift-click, or control-click of the highlighted potential contact information.

5. The method of claim 1, wherein a contact heuristic is at least one of a name, a telephone number, or an address.

6. A system for adding contact information, the system comprising:
   a memory; and
   at least one processor coupled to the memory, the at least one processor configured to:
   in response to a user identifying and interacting with potential contact information within a web page, parse the potential contact information and generate a contact indicator using the potential contact information, the generating the contact indicator comprising recognizing a pattern based on at least one contact heuristic that specifies patterns of data that indicate contact information for an individual or a place and the potential contact information, the contact indicator partially representing contact information for the individual or the place;
   send, to a server, a request for a contact identification profile matching the generated contact indicator, the request including the contact indicator partially representing contact information for the individual or the place;
   receive, from the server based on the request and the individual or the place having opted to provide contact information, a plurality of matching contact identification profiles, the plurality of matching contact identification profiles including all of the contact information within the plurality of matching contact identification profiles;
   provide, to the user, an option to select one of the plurality of matching contact identification profiles;
   provide, to the user, an option to modify the selected matching contact identification profile;
   after providing the option to modify the selected matching contact identification profile, provide the user an option of adding the selected matching contact identification profile to a personal contacts database; and
   in response to the user selecting the option to add the selected matching contact identification profile, add the selected matching contact identification profile to the personal contacts database.

7. The system of claim 6, wherein the at least one processor is further configured to detect a user highlighting a portion of the potential contact information, and parse the highlighted portion to form the contact indicator.

8. The system of claim 7, wherein the highlighting includes highlighting the potential contact information followed by one of a right click, left click, shift-click, or control-click of the highlighted potential contact information.

9. The system of claim 6, wherein the pattern of data of the contact heuristic at least partially matches a format for one of a name, a telephone number, or an address.

10. The system of claim 6, wherein the at least one processor is further configured to extract information from the selected matching contact identification profile and populate a display with the information for the selected matching contact identification profile.

11. A non-transitory computer-readable storage medium storing software comprising instructions that, upon execution by one or more computers, cause the one or more computers to perform operations comprising:
   in response to a user identifying and interacting with potential contact information within a web page, parsing the potential contact information and generating a contact indicator using the potential contact information, the generating the contact indicator comprising recognizing a pattern based on at least one contact heuristic that specifies patterns of data that indicate contact information for an individual or a place and the potential contact information, the contact indicator partially representing contact information for the individual or the place;
   sending, to a server, a request to identify a contact identification profile matching the generated contact indicator, the request including the contact indicator partially representing contact information for the individual or the place;
   receiving, from the server based on the request and the individual or the place having opted to provide contact information, a plurality of matching contact identification profiles, the plurality of matching contact identification profiles including all of the contact information within the plurality of matching contact identification profiles;
   providing, to the user, an option to select one of the plurality of matching contact identification profiles;
   providing, to the user, an option to modify the selected matching contact identification profile;
   after providing the option to modify the selected matching contact identification profile, providing the user an option of adding the selected matching contact identification profile to a personal contacts database; and
   in response to the user selecting the option to add the selected matching contact identification profile, adding the selected matching contact identification profile to the personal contacts database.

12. The non-transitory computer-readable storage medium of claim 11, wherein the user highlighting is a highlighting of the potential contact information followed by one of a right click, left click, shift-click, or control-click of the highlighted potential contact information.

13. The non-transitory computer-readable storage medium of claim 11, wherein a contact heuristic is one of a name, a telephone number, or an address.

14. The non-transitory computer-readable storage medium of claim 11, wherein providing the option to modify the contact identification profile further comprises:
   extracting information from the selected matching contact identification profile; and
   populating a display with the extracted information.

* * * * *